United States Patent [19]

Cirkler et al.

[11] 4,167,307
[45] Sep. 11, 1979

[54] LIQUID CRYSTAL DISPLAY DEVICE WITH SUPPLEMENTARY LIGHTING

[75] Inventors: Werner Cirkler, Ismaning; Hans Krüger, Munich, both of Fed. Rep. of Germany

[73] Assignee: Siemens Aktiengesellschaft, Berlin & Munich, Fed. Rep. of Germany

[21] Appl. No.: 791,519

[22] Filed: Apr. 27, 1977

[30] Foreign Application Priority Data

Apr. 30, 1976 [DE] Fed. Rep. of Germany ........ 2619367

[51] Int. Cl.$^2$ ................................................ G02F 1/13
[52] U.S. Cl. .................................... 350/345; 350/337; 350/338; 350/339
[58] Field of Search ................ 350/338, 345, 349, 339, 350/337

[56] References Cited

U.S. PATENT DOCUMENTS

| | | | |
|---|---|---|---|
| 3,833,287 | 9/1974 | Taylor et al. | 350/349 |
| 3,837,730 | 9/1974 | Hatfield et al. | 350/349 |
| 3,864,905 | 2/1975 | Richardson | 350/345 X |
| 4,006,968 | 2/1977 | Ernstoff et al. | 350/339 |
| 4,017,155 | 4/1977 | Yagi et al. | 350/345 |
| 4,043,636 | 8/1977 | Ederhardt et al. | 350/345 |

Primary Examiner—Edward S. Bauer
Attorney, Agent, or Firm—Hill, Van Santen, Steadman, Chiara & Simpson

[57] ABSTRACT

A liquid crystal display device characterized by a liquid crystal cell having a layer of liquid crystal material, which is switchable on a zonal basis between various optical states, interposed between a front and rear carrier plates; a fluorescent plate which is disposed behind the rear carrier plate of a liquid crystal cell in the path of observation and has light emergent or exit windows disposed behind the switchable liquid crystal zones; and at least one supplemental light source in optical contact with the fluorescent plate to provide light for exciting fluorescent centers in the fluorescent plate. The fluorescent plate has silvered edge surfaces and consists of a material which has an index of refraction greater than 1 and contains the fluorescent centers which are excited by ambient light to emit a fluorescent light isotropically. Preferably, the liquid crystal layer is interposed between front and rear electrodes which control the optical properties of the layer. In one embodiment, the cell includes polarizers which coact with the liquid crystal layer to control the emission of light through the exit windows of the fluorescent plate. In another embodiment, the liquid crystal layer contains a pleochroic dye which will absorb the fluorescent light to a high degree while the layer is in an un-energized state and only absorbed the fluorescent light to a limited degree while the layer is in an excited state. The light exit windows may be provided with dielectric layers, which will reflect on a color selected basis so that the multi-colored displays are obtainable and the dielectric mirrors and the plane of the fluorescent plate may be arranged to enclose an angle of the polarization so that the light emerging from the exit windows is polarized.

8 Claims, 1 Drawing Figure

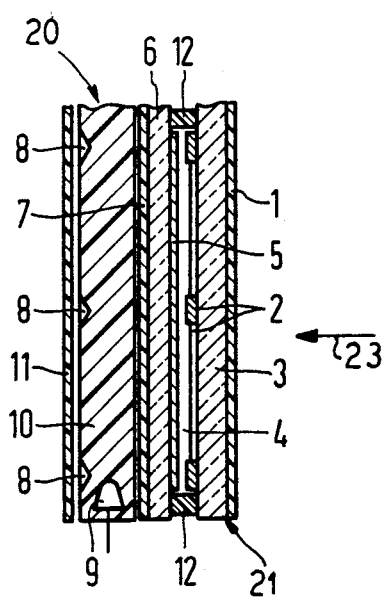

LIQUID CRYSTAL DISPLAY DEVICE WITH SUPPLEMENTARY LIGHTING

BACKGROUND OF THE INVENTION

The present invention is directed to a liquid crystal display device having a liquid crystal cell with a layer of liquid crystal material, which is switchable on a zonal basis between various optical states, interposed between front and rear carrier plates and a fluorescent plate disposed behind the rear carrier plate of the liquid crystal cell in the path of observation and provided with exit windows which are disposed behind the switchable liquid crystal zones.

Liquid crystal displays are passive displays and consequently have to be provided with supplementary lighting when used for certain purposes, for example, in clocks or watch faces that are to be read during both the day and night. In German Offenlegungsschrift 25 03 663, which corresponds to U.S. Pat. No. 3,984,176, a display device is disclosed in which a plate of carrier material having an index of refraction greater than 1 is disposed behind a liquid crystal cell in the path of observation. This plate is silvered on the back surface and the carrier material of the plate contains a large number of transparent particles having an index of refraction which is different than that of the carrier material. Light, which is artificially generated is directed into this plate and is refracted into a wide variety of directions. If one wishes to obtain an attractive optical quality level with such a plate, and above all else illuminate the face of the screen uniformly, the light reflecting particles must be distributed very carefully and in certain circumstances with a specific concentration gradient.

A liquid crystal display with a fluorescent plate which has silvered edges and acts as a light trap has been suggested in German patent application P 25 54 226. In this suggested arrangement, ambient light is received by fluorescent centers and causes or excites a fluorescent light which is fed by the plate in an amplified form to individual segment electrodes. However, this arrangement has no provision for any supplementary lighting.

In U.S. patent application Ser. No. 747,035 filed Dec. 2, 1976, which application includes the disclosure of the above mentioned German application P 25 54 226 and additional German applications, a suggestion for providing supplemental lighting for a fluorescent plate of a liquid crystal display device was made.

SUMMARY OF THE INVENTION

The object of the present invention is to provide a liquid crystal display device, which, when compared with known embodiments with at least equal display quality, gives the same contrast with a less powerful supplementary light source or gives greater contrast with the light source of the same intensity and which device does not entail any particular production costs to achieve this feature and in particular is also space saving in form. Since a particular advantage of a liquid crystal display is the extreme tiny power consumption, the present invention is directed to a device which has a high light yield with a low power consumption so that a desirable feature of the liquid crystal display device is not easily lost. If the display is to be powered from a battery of the smallest possible size or volume, for example a battery of a wrist watch, this feature is of very great importance.

To accomplish these tasks, a liquid crystal display device in accordance with the present invention comprises a liquid crystal cell having a layer of liquid crystal material being switchable on a zonal basis between various optical states and being interposed between a front and rear carrier plate; a fluorescent plate disposed behind a rear carrier plate of the liquid crystal cell in the path of observation, said fluorescent plate having silvered edge surfaces and consisting of a material having an index of refraction greater than 1 and containing fluorescent centers which are excited by ambient light to emit a fluorescent light isotropically, said fluorescent plate being provided with light emergent or exit windows disposed behind the switchable liquid crystal zones; and at least one supplementary light source in optical contact with the fluorescent plate, said source providing light for exciting the fluorescent centers.

In the proposed display, a large part of the light emitted by the light source is trapped inside of the fluorescent plate by nonrecurrent fluorescent diffusion and subsequent total reflection at the top and bottom faces of the fluorescent plate or by mirror reflections on the silvered side or edge faces. The fluorescent light is scattered within the plate and is finally emitted in the form of an intensive beam of light through an area containing the switchable liquid crystal zones which are usually defined by electrode segments. Thus, unlike the device in the U.S. Pat. No. 3,984,176, which has substantially a uniform intensity over the entire surface of the cell, the liquid crystal display device of the present invention has the fluorescent light concentrated at the desired locations of the switchable zones of the liquid crystal cell and thus provides a high light intensity for images being displayed relative to the background lighting of the cell.

The fluorescent plate has proven particularly effective in combination with an artificial light source. Thus, in spite of the usually rough point form of the light source, one obtains a particularly strong, clear display because the light intensity at the light emergent or exit windows remains very constant due to the physical properties of the fluorescent plate and the light of wave lengths other than that of the fluorescent light can also be emitted at the light exit windows. If the display device uses conventional field effect liquid crystal cells, light leaving the front face of the plate near the light exit windows is kept away from the observer by the polarizers of the cell. In addition, one can also use sources of light with a high ultraviolet content, which is then converted into visible light when the fluorescent plate is provided with suitable fluorescent material.

When the light source is incorporated into the fluorescent plate, the proposed display becomes compact and handy to use. If, in addition, the plate is also hybridised with the liquid crystal cell by casting the plate on the cell, an extremely compact structure with smooth faces on all sides is obtained. Since the liquid crystal coating or layer only lights up in zones in which it diffuses or changes its double refracting property in this type of structure, one can eliminate any polarizers because of the laws of refraction. But in the latter case, the indices of refraction of the plate and the liquid crystal cell would need to be matched.

For the display in accordance with the present invention, one may consider in particular the light emitting diodes, fluorescent lights, and also incandescent lights as potential light sources. Here the light yield becomes particularly high if the light source and the fluorescent plate are matched, i.e. if both components are made of material having matched indices of refraction and perhaps the light source is enclosed in a casing of a specific form and the optical density and/or the emission spectrum of the light source coincides as far as possible with the excitation spectrum of the fluorescent material. The emission spectrum of the fluorescent lamp and the absoprtion spectrum of the fluorescent plate can be matched by a choice of the fluorescent material and by a choice of the phosphorous of a fluorescent lamp.

In the proposed display, the colors appearing on the screen are not determined by the colors of the supplementary lighting, but by the emission spectrum of the embedded fluorescent materials forming the fluorescent centers. Thus, one can show colored symbols on a background of different color merely by choosing a specific fluorescent substance or again use this choice to give one part of the symbol one specific color and another part of the symbol another color. The last named option can be realized with a high level of light utilization by coating the light emergent or exit windows not with the usual metallic reflective layer but with the dielectric mirror which reflects on a color selective basis. In fact, dielectric mirrors do not filter out the unreflected wave lengths but when the windows are suitable formed, return these to the inside of the fluorescent plate.

Spatially separated liquid crystal cells, such as utilized with auxiliary displays, can be illuminated with a single fluorescent plate. To this end, one only needs to connect light conductors, usually light conducting fiber bundles to the fluorescent plate of the main display and to run the free ends of these conductors individually behind one of the auxiliary displays.

As mentioned hereinabove, the liquid crystal display device of the present invention may utilize a liquid crystal layer disposed between polarizers to control the emission of light of the display. In one embodiment of the present invention, the requirement of polarizers is removed by providing the liquid crystal material which may be either a cholesteric or nematic material with at least one pleochroic dye, which will absorb the fluorescent light to a high degree while the layer is in an unenergized state but only will absorb the fluorescent light to a limited degree while the layer is in an excited state.

BRIEF DESCRIPTION OF THE DRAWING

The FIGURE is a partial cross-sectional view of a liquid crystal display device in accordance with the present invention.

DESCRIPTION OF THE PREFERRED EMBODIMENT

The principles of the present invention are particularly useful in a liquid crystal display device generally indicated at 20 in the FIGURE. Liquid crystal display device 20 includes a liquid crystal cell generally indicated at 21, a fluorescent plate 10, and a light source 9, which is illustrated as being embedded in the fluorescent plate 10 and is integral therewith.

The liquid crystal cell 21 includes a front carrier plate 3 and a rear carrier plate 6, which are spaced apart by a spacing frame 12 which coacts to form a chamber for receiving a liquid crystal material such as the liquid crystal layer 4. The front carrier plate 3 on an outer surface is providd with a polarizer 1 and on the inner surface is provided a plurality of segmented electrodes 2, which are formed of a transparent electrical conducting coating interrupted in the desired manner to form the pattern of the electrodes such as the seven segment electrode pattern. The rear carrier plate 6 is illustrated as having a continuous rear electrode 5, which is also formed by a transparent electrical conducting coating. A rear linear polarizer 7 is provided on the outer surface of the rear carrier plate 6.

As illustrated, the fluorescent plate 10, whose edge surfaces are silvered, is provided with silvered notches 8. The fluorescent plate 10 is positioned behind the rear carrier plate 6 of the liquid crystal cell 21 relative to the direction of viewing or path of observation as indicated by arrow 23 with the exit windows which are formed by the notches aligned with the segment electrodes 2. As illustrated, the display device 20 also includes a light absorbing rear plate 11, which is disposed behind the fluorescent plate 10.

Each of the elements of the device 20 can be of suitable well known materials, for example suitable fluorescent plates are already available on the market. In the present case, the light source is illustrated as being a light emitting diode, which was disposed within a mold for the fluorescent plate so that when the material of the fluorescent plate is cast in the mold, the diode or light source 9 will be embedded in the cast structure of the plate 10.

The liquid crystal cell 21 will work on the principle of the so-called "rotary cell" or "twisted nematic cell". The liquid crystal layer is a nematic substance with a positive dielectric anisotrophy and a homogeneous texture which is twisted through 90° in a direction of the normal of the plates 3 and 6 as it extends from the surface adjacent one of the plates 3 and 6 to the other plate. The two polarizers are parallel to one another so that the display will be opaque when in an inoperative state or un-energized state but the display when energized or excited will be translucent. Thus, light passing the polarizers 7 will have its direction of polarization rotated 90° by the inactive or un-energized liquid crystal layer and, therefore, the light cannot pass the polarizer 1. However, when energized, the layer will not rotate the direction of polarization so that the light polarized by the polarizer 7 will pass through the polarizer 1. The operation of a rotary cell is well known and is disclosed in German Offenlegungsschrift No. 21 58 563 which corresponds with Bristish Pat. No. 1,372,868.

One can eliminate the polarizer 7, if for example, the light is already polarized linearly as it is brought out of the fluorescent plate 10. For example, if the notches 8 in the plate 10 have dielectric mirrors which are at an angle to the plane of the plate 10 corresponding to so-called polarization angle, the light, which is decoupled from the plate 10, will be linearly polarized. The polarizers can also be eliminated if the liquid crystal layer have a pleochroic dye mixed therein so that the dye absorbs the fluorescent light to a high degree while the liquid crystal material is in an inactive or un-excited state, but when the liquid crystal layer is transformed to an excited state, the dye has only a limited degree of absorption. The liquid crystal material may be either a nematic substance or a cholesteric substance which is homeotropic when in the excited state.

While the above mentioned embodiment was described with the liquid crystal zones being switched by the application of an electrical voltage between the electrodes 2 and 5 to excite or energize the liquid crystal material therebetween, the individual liquid crystal zones can also be switched by the application of other physical forces. For example, liquid crystal material may be one whose optical properties are switched by a change in temperature. In addition, liquid crystal cell display devices may be used generally for measuring and displaying other specific variables.

Although various minor modifications may be suggested by those versed in the art, it should be understood that we wish to embody within the scope of the patent warranted hereon, all such modifications as reasonably and properly come within the scope of our contribution to the art.

We claim:

1. A liquid crystal display device comprising a liquid crystal cell having a layer of liquid crystal material switchable on a zonal basis between various optical states being interposed between a front end and rear carrier plate; a fluorescent plate disposed behind the rear carrier plate of the liquid crystal cell in a path of observation, said fluorescent plate having silvered edge surfaces and consisting of a material having an index of refraction greater than 1 and containing fluorescent centers which are excited by an ambient light to emit a fluorescent light isotropically, said fluorescent plate being provided with light exit windows disposed behind the switchable liquid crystal zones, each of the light exit windows being a notch having surfaces, each of said surfaces being provided with a dielectric mirror which reflects on a color selection basis so that multi-colored displays are obtainable; and at least one supplemental light source being embedded in the fluorescent plate to be in optical contact with the material of the plate, said source providing light for exciting the fluorescent centers.

2. A liquid crystal display device according to claim 1, wherrein the light source is optically matched to the carrier material of the fluorescent plate.

3. A liquid crystal display device according to claim 1, characterized in that the emission spectrum of the light source is matched to the excitation spectrum of the fluorescent centers.

4. A liquid crystal display device according to claim 1, wherein the light source is a light emitting diode.

5. A liquid crystal display device according to claim 1, wherein the light source is a fluorescent lamp.

6. A liquid crystal display device according to claim 1, wherein the light source is an incandescent lamp.

7. A liquid crystal display device comprising a liquid crystal cell having a layer of liquid crystal material switchable on a zonal basis between various optical states being interposed between a front and rear carrier plate; a fluorescent plate disposed behind the rear carrier plate of the liquid crystal cell in a path of observation, said fluorescent plate having silvered edge surfaces and consisting of a material having an index of refraction greater than 1 and containing fluorescent centers which are excited by an ambient light to emit a fluorescent light isotropically, said fluorescent plate being provided with light exit windows disposed behind the switchable liquid crystal zones, each of the light exit windows being a notch having surfaces provided with a dielectric mirror which reflects on a color selective basis so that multi-colored displays are obtainable, said dielectric mirrors and a plane of the fluorescent plate enclosing an angle of polarization therebetween so that the light emerging from the exit windows is polarized; and at least one supplemental light source in optical contact with the fluorescent plate, said source providing light for exciting the fluorescent centers.

8. A liquid crystal display device comprising a liquid crystal cell having a layer of liquid crystal material switchable on a zonal basis between various optical states being interposed between a front and rear carrier plate; a fluorescent plate disposed behind the rear carrier plate of the liquid crystal cell in a path of observation, said fluorescent plate having silvered edge surfaces and consisting of a material having an index of refraction greater than 1 and containing fluorescent centers which are excited by an ambient light to emit a fluorescent light isotropically, said fluorescent plate being provided with light exit windows disposed behind the switchable liquid crystal zones, each light exit window being a notch having surfaces provided with dielectric mirrors, said dielectric mirrors and a plane of the fluorescent plate enclosing an angle of polarization therebetween so that the light emerging from the exit windows is polarized; and at least one supplemental light source being embedded in the fluorescent plate to be in optical contact with the material of the plate, said source providing light for exciting the fluorescent centers.

* * * * *